(12) United States Patent
Aichang et al.

(10) Patent No.: US 9,870,692 B2
(45) Date of Patent: Jan. 16, 2018

(54) SERVER COMPUTING DEVICE LIGHTING FOR MAINTENANCE

(71) Applicant: International Business Machines Corporation, Armonk, NY (US)

(72) Inventors: Bruce J. Aichang, Tucson, AZ (US); Amy N. Blea, Round Rock, TX (US); George T. Kattampallil, Tucson, AZ (US); Said Lamri, Tucson, AZ (US); Carlo F. Saba, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 14/801,980

(22) Filed: Jul. 17, 2015

(65) Prior Publication Data

US 2017/0016585 A1 Jan. 19, 2017

(51) Int. Cl.
*G08B 21/18* (2006.01)
*G08B 5/36* (2006.01)
*G06F 11/00* (2006.01)

(52) U.S. Cl.
CPC .............. *G08B 21/18* (2013.01); *G06F 11/00* (2013.01); *G08B 5/36* (2013.01)

(58) Field of Classification Search
CPC ............ G08B 21/18; G08B 5/36; G06F 11/00
See application file for complete search history.

(56) References Cited

U.S. PATENT DOCUMENTS

| 7,837,352 | B2 | 11/2010 | Graybill et al. |
| 8,177,404 | B2 | 5/2012 | Weng |
| 2009/0127988 | A1 | 5/2009 | Lucuks et al. |
| 2011/0305056 | A1* | 12/2011 | Chien ............... F21S 8/035 363/178 |
| 2014/0292208 | A1 | 10/2014 | Chemel et al. |

FOREIGN PATENT DOCUMENTS

| CN | 203070187 U | 7/2013 |
| CN | 203560843 U | 4/2014 |
| CN | 103853268 A | 6/2014 |
| JP | 2011039754 A | 2/2011 |

* cited by examiner

*Primary Examiner* — Thomas M Sember
(74) *Attorney, Agent, or Firm* — Joseph W. Cruz

(57) ABSTRACT

A light source unit may be disposed at a first posterior side location of a server computing device. The light source unit may be configured to at least provide lighting to a posterior side of the server computing device via one or more light emitting diodes. The light emitting diodes may be coupled to at least a second posterior side location of the server computing device. The light source unit may include a first universal serial bus (USB) interface configured to receive a first end of a USB cable. The USB cable may be configured to connect to a power source at a second end. The power source may be for use in providing power to the light emitting diodes.

18 Claims, 5 Drawing Sheets

SERVER COMPUTING DEVICE LIGHTING FOR MAINTENANCE

BACKGROUND

This disclosure relates generally to server computing devices, and more specifically, to providing lighting to server computing devices such that maintenance work may be performed.

A data center is a physical (or virtual) centralized repository for data storage, data management, and data dissemination. The data may correspond to information that is organized around a particular body of knowledge or a particular business. A data center may be a facility that occupies one or more rooms. The data center may include various server computing devices mounted in rack cabinets, which may be placed in rows forming aisles. This orientation may allow maintenance workers to access the front or posterior side (e.g., rear side) of each cabinet. Each server computing device module (e.g., blade) may include a posterior side where various cables (e.g., patch cables) are connected to various input/output (I/O) interfaces at a first end and connected to other I/O interfaces at a second end. A maintenance worker may frequently have to service these modules by removing and reconnecting the cables. For example, a maintenance worker may have to test a circuit and may accordingly identify a particular cable by searching for a cable marker (i.e., identifier).

SUMMARY

One or more embodiments are directed to a system, a light source unit, and a kit for providing lighting to a server computing device. A light source unit may be disposed at a first posterior side location of the server computing device. The light source unit may be configured to at least provide lighting to a posterior side of the server computing device via one or more light emitting diodes. The light emitting diodes may be coupled to at least a second posterior side location of the server computing device. The light source unit may include a first universal serial bus (USB) interface configured to receive a first end of a USB cable. The USB cable may be configured to connect to a power source at a second end. The power source may be for use in providing power to the light emitting diodes.

Figure 1:
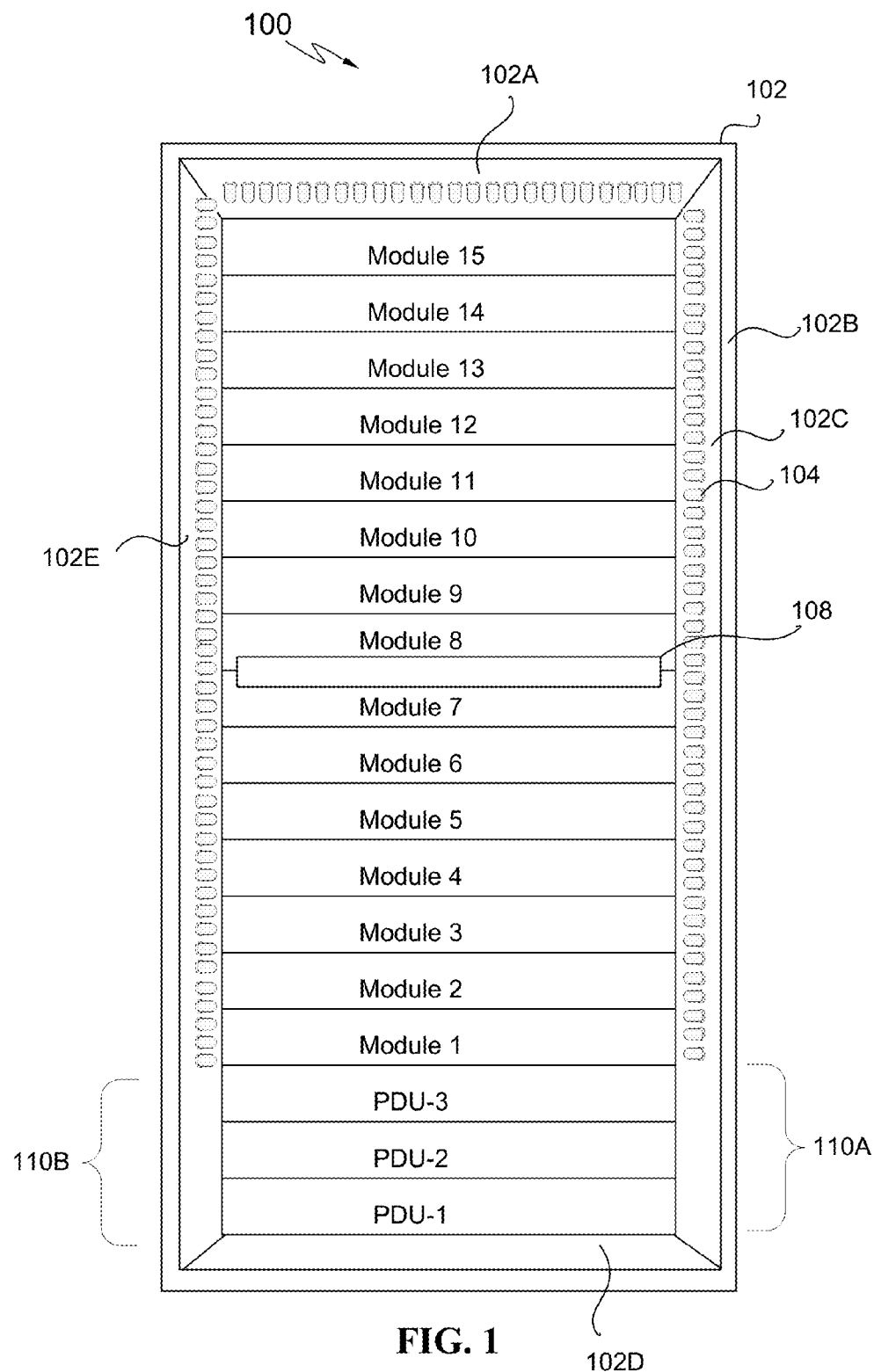
FIG. 1 is a posterior perspective view of a server computing device with LEDs coupled to inner sidewalls of a frame of the server computing device, according to embodiments.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the present disclosure is to cover all modifications, equivalents, and alternatives falling within the spirit and scope of the present disclosure.

DETAILED DESCRIPTION

Aspects of the present disclosure generally relate to providing lighting to server computing devices such that maintenance work may be performed. While the present disclosure is not necessarily limited to such applications, various aspects of the disclosure may be appreciated through a discussion of various examples using this context.

Data centers may include low-lit rooms to house their server computing devices, as data centers may consume an enormous quantity of energy. Because of the enormous amount of increasing energy consumption, more and more providers may be adopting aggressive energy conservation practices. Consequently, however, maintenance workers may be at a disadvantage for engaging in repairs or maintenance on each module, as it may be difficult to see to perform their duties. Each server computing device module may include several bundled (or non-bundled) cables, and each cable may include a small cable marker such that the worker can properly identify the cable needed for repair or maintenance. Currently, maintenance workers may be forced to hold a flashlight or some other lighting device up to each server computing device module in order to see the cable markers or other connections at the posterior side of the server computing device. This may be cumbersome, particularly when trying to remove or replace a module or other large piece of hardware, as the worker may be forced to place the lighting device in a separate area in order to hold the module with two hands. However, if the worker places the lighting device in a separate area, he or she may then not able to see.

Lighting may be fixed to the server computing device or other apparatus, but the power supply utilized for the lighting may be a power supply unit (PSU) or power distribution unit (PDU), which includes a power cord that plugs into an electrical socket. These units may convert mains alternating-current (AC) to direct current (DC) to supply power for each server computing device. However, these power supply methods may consume a large quantity of power in a data center and may therefore be inconsistent with today's movement of adopting aggressive energy conservation practices for data centers. Accordingly, embodiments of the present disclosure are directed towards providing one or more light emitting diodes (LEDs) coupled to a posterior side location of a server computing device and the power source utilized for the LEDs includes a universal serial bus (USB) cable coupled to a server computing device module power source or other user computing device power source. USB connected devices coupled with utilizing LEDs (which may utilize a small quantity of energy) may allow for consumption of a significantly small quantity of power, thereby aligning with the energy conservation practices for data centers.

FIG. 1 is a posterior perspective view of a server computing device 100 with LEDs coupled to inner sidewalls (i.e., side, or inside) of a frame of the server computing device 100, according to embodiments. The server computing device 100 may include a frame 102. The frame 102 may include an inner top portion 102A, an outer edge 102B, a first inner sidewall 102C, an inner bottom portion 102D, and a second inner sidewall 102E. The server computing device may also include one or more LEDs 104, a plurality of slots or shelves to receive the modules (module 1-15) and PDUs, (PDU-1, PDU-2, and PDU-3). Moreover, the server computing device 100 may include a light source unit 108, a first section 110A where no LEDs are present, and a second section 110B where no LEDs are present. As disclosed herein the term "posterior," may mean back side, rear side, or any side of the server computing device 100 or module which contains I/O interfaces and/or cable(s) (e.g., patch cables). The term "server computing device" may mean the server computing device itself and/or a part associated with the server computing device, such as a frame, I/O drawers, modules, etc.

The server computing device 100 may be any suitable server computing device for embodiments of the present disclosure. For example, the server computing device 100 may be configured as a blade server, rack server, a cloud server, etc. Types of server hosting may include shared, virtual, clustered (e.g., Network Attached Clustered Storage Systems), and cloud systems or any other hosting. Server application types may include web servers, application servers, specialized servers such as file, printer and database servers, media and mail servers, etc. It should be understood that the quantity and presence of the Modules (1-15) and PDUs (1-3) are by way of illustration only. Accordingly, in some embodiments, the server computing device 100 may not necessarily include any of the modules (1-15), or the server computing device 100 may include a different quantity of modules (e.g., 7 modules). As disclosed herein, the term "module" may mean server computing device node, compartment, I/O drawer, book, blade, instance (e.g., grouped components), etc. Moreover, the server computing device 100 may not necessarily include the PDU-1, PDU-2, PDU-3 as it is illustrated in FIG. 1, or may include more or less PDUs.

The frame 102 as disclosed in the present disclosure may mean housing, cabinet, rack, or the like and provides the structural enclosure and/or support (e.g., along with various module chasis) for each of the Modules and PDUs. As illustrated in FIG. 1, the LEDs 104 may be positioned beginning at the first section 110A within the inner sidewall 102C and form a continuous layout (e.g., pattern, presentation, organization, etc.) up from the inner sidewall 102C, to the inner top portion 102A (i.e., inside top portion of the frame), to the inner sidewall frame 102E and end at the second section 110B. It should be understood that the particular positioning, orientation, and quantity of the LEDs 104 is shown by way of illustration. Accordingly, the LEDs 104 may be coupled to any posterior side location of the server computing device. For example, the LEDs 104 may not necessarily form a continuous layout, but may be presented in distinct units along the server computing device 100 (e.g., one unit right at the first section 110A, and another unit right at the second section 110B). Further, the LEDs may be encompassed around the entire server computing device 100. For example, instead of beginning at the first section 110A and ending at the second section 110B, the LEDs 104 may also be included in the first section 110A, the second section 110B, and the inner bottom portion 102D. Moreover, the LEDs 104 may be disposed at the outer edge 102B, on the modules themselves (e.g., encompassing all four sides, posterior edges, etc. of module 15), or any other location where the I/O interfaces or cables are present. FIG. 1 illustrates that only one row of LEDs 104 are utilized, but it is understood that more rows may be included to provide more lighting.

Notwithstanding that the positioning of the LEDs 104 is shown by way of illustration in FIG. 1, there may be various advantages to the positioning illustrated in FIG. 1. For example, by positioning the LEDs 104 at the inner sidewall 102C, the inner top portion 102A, and the inner sidewall 102E, the lighting may be provided directly to each of the modules 1-15 in case any of the cable markers need to be quickly and efficiently identified in low-lit conditions or any of the modules 1-15 need to be replaced or repaired. Conversely, if the LEDs 104 were placed at the outer edge 102B, the LEDs 104 may not provide direct lighting to each of the modules. Further, by placing the LEDs 104 at a portion of the inner sidewall 102C (e.g., not the entire inner sidewall) by starting and ending at the first section 110A and the second section 110B where the PDUs are, a maintenance worker may not necessarily need lighting or as much lighting at the PDUs because the PDUs may not require maintenance workers to identify small cable markers among many cables, as the PDUs may include large non-identifiable cables connected to outlet sockets.

Figure 2:
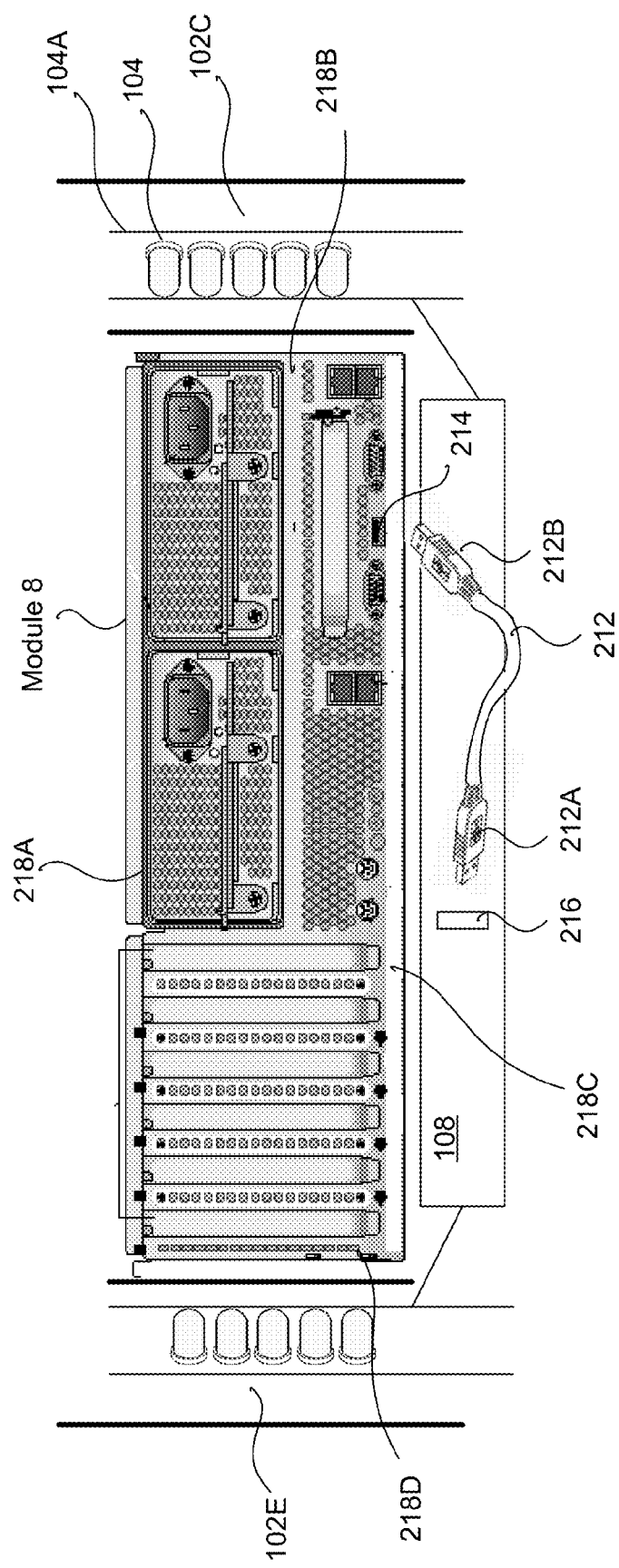
FIG. 2 is an example of the Module 8 of FIG. 1, and the light source unit of FIG. 1, which illustrates that the Module 8 may be the power source for the LEDs, according to embodiments.

FIG. 2 is an example of the Module 8 of FIG. 1, and the light source unit 108 of FIG. 1, which illustrates that the Module 8 may be the power source for the LEDs, according to embodiments. FIG. 2 may include LEDs 104, an LED strip 104A, the inner sidewall 102C, Module 8, inner sidewall 102E, the light source unit 108 that includes a USB interface 216, signal lines 230, and a USB cable 212 that includes a first end 212A and a second end 212B. The Module 8 may include a USB interface 214, a top edge 218A, a first side edge 218B, a bottom edge 218C, and a second side edge 218D.

The term "light source unit" (e.g., light source unit 108) as described herein may mean any device capable of being the source for illuminating light and other input/output functions, as described in more detail below. The light source unit 108 may be configured to at least provide lighting to the posterior side of the server computing device via the one or more LEDs 104. In order to provide light via the LEDs 104, the USB cable 212 may be connected at the USB interface 216 of the light source unit 208 with the first end 212A and connected to the USB interface 214 of the Module 8 with the second end 212B. The ends 212A and 212B be may be connectors of the cable 212. Accordingly, the Module 8 may provide power or be the power source to the light source unit 108, and the light source unit 108 may initiate the lighting process to light the LEDs 104. The term "power source" as described herein may mean any device that provides power to the LEDs such that they are able to maintain lighting. In some embodiments, the power source may be a maintenance module. As disclosed herein, the maintenance module may be a module responsible for managing at least some of the server computing device cables. The maintenance module may include more USB interfaces than other modules and may be located as the center-most oriented module within the frame. Moreover, the maintenance module may include a cable management arm to direct, organize, and manage cables so as to reduce entanglement of cables. In some embodiments, Module 8 is the maintenance module. It is understood that although Module 8 is illustrated as being the power source, any of the Modules (e.g., Module 1-15 of FIG. 1) or posterior side of a server computing device may be the power source.

The light source unit 108 may disposed at any posterior side location of the server computing device. For example, as illustrated in FIG. 1 and FIG. 2, the light source unit 108 is disposed or coupled at or near (e.g., immediately below) the posterior side of Module 8. Alternatively, the light source unit 108 may be coupled to a server computing device frame (e.g., frame 102 of FIG. 1), or any of the other modules (e.g., modules 1-15 of FIG. 1 or PDUs 1-3 of FIG. 1). Moreover, there may be more than one light source unit 108. For example, each Module may include a light source unit for providing light that surrounds each side of a module.

The LEDs 104 may be coupled to LED strips 104A. The term "strips" may be identical in some embodiments, to "light bars," units of light bars, "housings," etc. that house each of the signal lines 230 going from the light unit 108 to each of the LEDs 104. The LED strips 104A may be fastened to the server computing device in various manners. For example, the LED strips 104A may include an adhesive backing and therefore be fixed at the inner posterior sidewall 102C. In some embodiments, the light source unit 108 may be located within the strips 104A such that the LEDs 104 and the light source unit 108 are a single unit. Accordingly, the LEDs 104 and the light source unit may be located in the same posterior side location. In some embodiments, the LED strips may be attached to railings (e.g., a railing that extends from the bottom of the inner side wall 102C to the top of the inner side wall 102C) via fasteners. Any suitable fastener may be utilized to attach the LEDs 104 to the frame or server computing device such as clips, adhesive strips, etc.

In some embodiments, the LEDs 104 themselves may include a transmitter that is coupled with a receiver (or light-emitting diode) which may, for example, convert electrons (e.g., emitted from the light source unit 108) to photons in order for the LEDs 104 to emit visible light. The LEDs 104 may be any suitable LED. For example, the LEDs 104 may be Gallium Arsenide (GaAs), infra-red (or red) LEDs, Zinc Selenide (ZnSe) blue LEDS, or any other LEDs that utilize various semiconductors to produce various wavelengths of light. Alternatively any suitable light source may be used other than LEDs 104. For example, the light source may be reflectorized light, fluorescent light, high-intensity discharge, or any other suitable light source. As described above, in some embodiments, the LEDs 104 may be coupled to the actual server modules themselves and may encompass the entire module. For example, using FIG. 2, the LEDS may be disposed at a first posterior side edge 218B or wall of the Module 8, along the top posterior edge 218A, along a second posterior side edge 218D or wall, and along a bottom posterior edge 218C of the Module 8.

Figure 3:
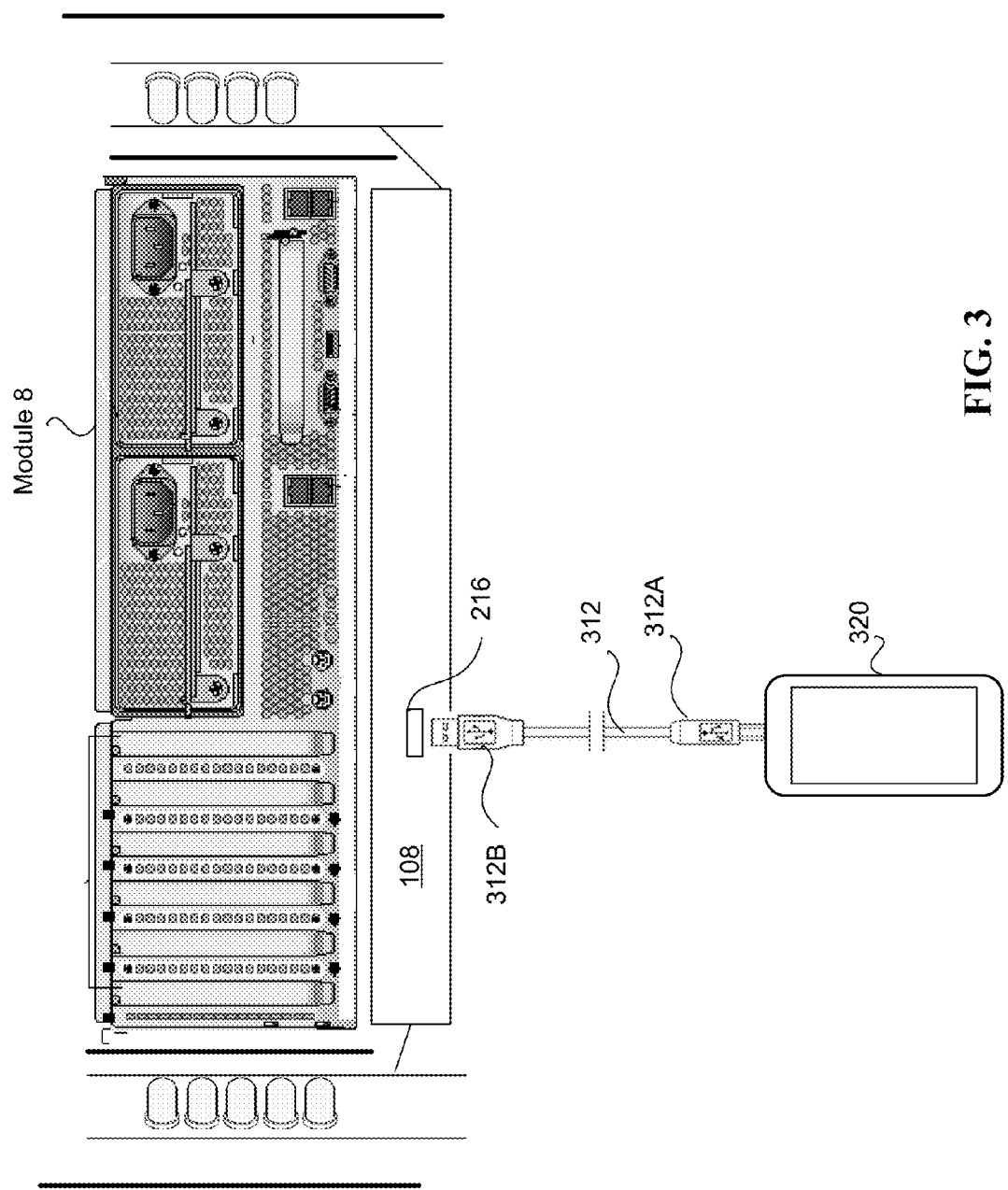
FIG. 3 is an example of the Module 8 of FIG. 1, and the light source unit of FIG. 1, which illustrates that a user computing device may be the power source for the LEDs, according to embodiments.

FIG. 3 is an example of the Module 8 of FIG. 1, and the light source unit 108 of FIG. 1, which illustrates that a user computing device may be the power source for the LEDs, according to embodiments. As illustrated in FIG. 3, a USB cable 312 may include a first end 312B or connector that is for use in plugging into the USB interface 216 of the light source unit 108. The USB cable may further include a second end 312 or connector which may be for use in plugging into a user mobile phone 320, which is the power source. In some embodiments, the second end 312 may be a micro USB connector in order to properly provide interface with the mobile phone 320. Although FIG. 3 illustrates that the user computing device is a mobile phone 320, the user computing device may be any other suitable computing device. For example, the computing device may be a smart watch, a portable computer, a laptop or notebook computer, a tablet computer, a pocket computer, a handheld radio, a remote control, or any other suitable computing device.

In some embodiments, the power source is not necessarily a computing device, but may be any user device having a battery and a USB interface. For example, the power source may be an external battery with a USB interface (e.g., mobile phone battery pack).

There may be various advantages for utilizing a user computing device as the power source in providing the light for the LEDS. For example, if the user computing device is the power source, then neither the data center nor any other portion of the server computing device is utilizing power, thereby aligning with energy conservation practices. Moreover, a maintenance worker would be able to free up both of his or her hands without compromising the amount of lighting he or she receives.

In an example illustration, if the maintenance worker had to remove and repair a particular module, e.g., Module 4 of FIG. 1, then the maintenance worker may remove his or her mobile phone 320 from his or her pocket and utilize a light on the mobile phone 320 itself to first plug the first end 312 into the USB interface 216 and the second end 312A into the mobile phone 320. The maintenance worker may then pull out another Module slightly, e.g., Module 8, and place the mobile phone 320 on the module 8. Then the worker may turn on a switch (discussed in more detail below) of the light source unit 108 such that the LEDs light up the posterior side of the server computing device providing an adequate amount of light to the entire posterior side of the server computing device. The maintenance worker may then be able to have both of his or her hands free to be able to repair Module 4. This may be in contrast of a worker who merely uses lighting on his or her mobile phone, flashlight, or any other separate lighting device. If a maintenance worker uses a separate light source (e.g., a mobile phone itself), in order to free up both of the maintenance worker's hands for large repairs, he or she may have to place the separate light source down and try to angle the lighting appropriately, which may be cumbersome and not provide the needed amount of lighting. Moreover, the worker may try to place the lighting device in his or her mouth, which may be uncomfortable and arduous. Further, even if the worker managed to bring a separate lighting device in the data center that provides efficient lighting, the lighting device itself may be bulky and non-intuitive for carrying to different places, as opposed to a mobile phone, or a smart watch for example.

Figure 4:
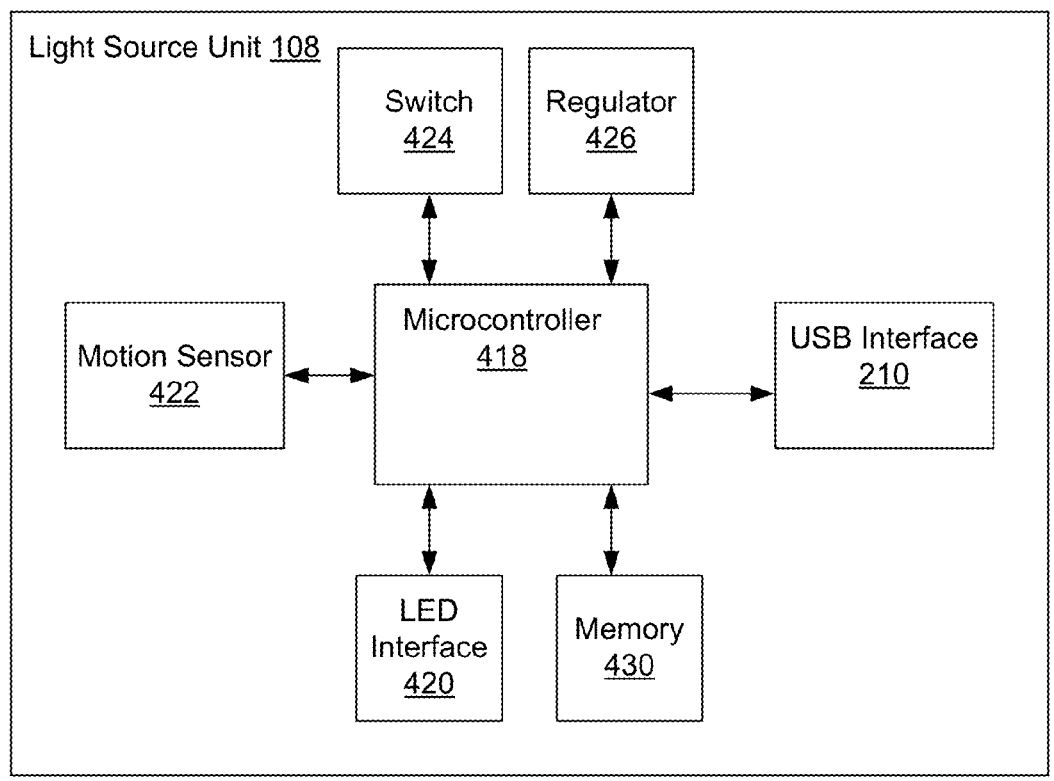
FIG. 4 is a block diagram of an example light source unit, according to embodiments.

FIG. 4 is a block diagram of an example light source unit 108, according to embodiments. In some embodiments, the light source unit 108 may include a microcontroller 418 that is communicatively coupled to a motion sensor 422, a switch 424, a regulator 426, a USB interface 210, an LED interface 420, and a memory 430. In some embodiments, the light source 108 may utilize a microprocessor or other processing capabilities instead of the microcontroller 222. Accordingly, in various embodiments, the light source unit 108 may include more or less of the components as illustrated in FIG. 4 (e.g., the light source unit 108 may not include a memory 430 in microprocessor environments).

The microcontroller 222 may be a small computing device utilized to receive input signals and communicate the input results to one or more output devices. The microcontroller 222 may include one or more processors, a memory, and peripherals. In an example illustration and in some embodiments, the light source unit 108 may include a switch 424 disposed on an external surface of the light source 108 such that a user may provide input for use in turning the LEDs on or off. Accordingly, the microcontroller 418 may receive user input at switch 424 to activate (turn on) the LEDS by communicating the received input to the LED interface 420 such that the LEDs are activated for lighting.

Figure 5:
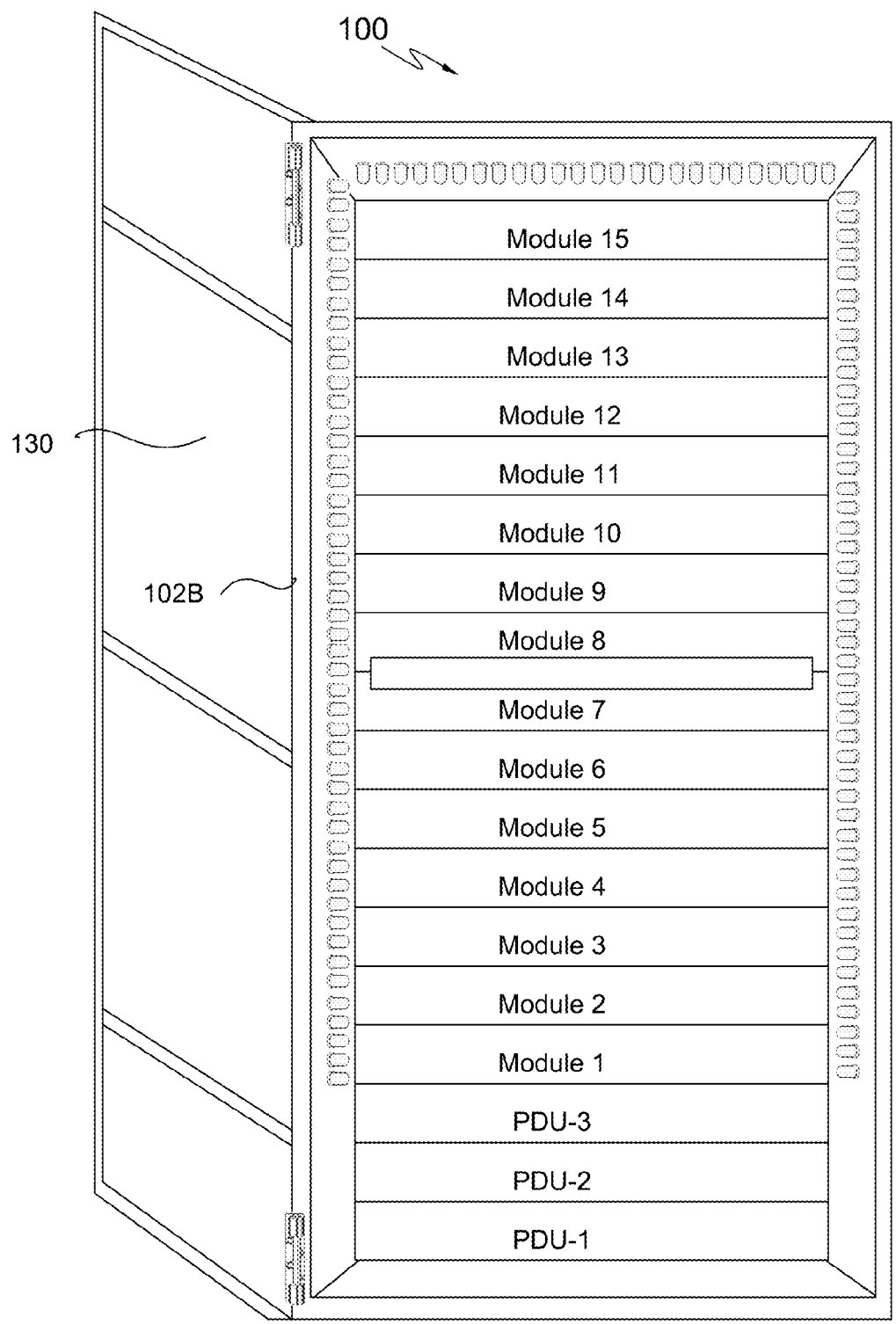
FIG. 5 is the server computing device of FIG. 1 that includes a door axially coupled to the frame at the outer edge.

In some embodiments, the light source unit 108 includes a motion sensor 422 (e.g., instead of or in addition to the switch 424) configured to cause the plurality of LEDs to turn on or off when a door is opened on a posterior server computing device frame. For example, FIG. 5 is the server computing device 100 of FIG. 1 that includes a door 130 axially coupled (e.g., can open or shut about an axis) to the frame at the outer edge 102B. In some embodiments, the motion sensor 422 may be configured to transmit a unit of microwave radio energy (or ultrasonic sound waves) at particular intervals (e.g., every 0.4 seconds) and the light source unit 108 may store reflective patterns of the transmitted energy to communicate the appropriate outputs when necessary. For example, if the door 130 is closed, the motion sensor 422 may transmit radio energy and the energy may bounce back or reflect off the door 130 in a specified pattern that is stored by the microcontroller 418. This particular pattern may be associated with the LEDs being inactivated or turned off. However, when a maintenance worker or user opens the door 130, the reflective pattern may be different than the reflective pattern emitted when the door 130 is closed, as the radio energy may not come in contact with the entire door 130 when it is opened. Accordingly, any reflective pattern that is different than the one experienced when the door 130 is closed may cause the microcontroller 418 to communicate via the LED interface 420 to turn on the plurality of LEDs.

In other embodiments, the motion sensor 422 is coupled to any posterior side of the server computing device that is not necessarily the light source unit 108. For example, the motion sensor 422 may be coupled to any of the posterior sides of any of the modules of the server computing device. The motion sensor 422 may also be coupled to the posterior frame of the server computing device, or any other posterior side location.

In some embodiments, the light source unit 108 further includes a regulator 426. The regulator 426 may be a voltage regulator configured to regulate the voltage received from a USB cable to transmit to the LEDs. For example, a USB cable (e.g., USB cable 212) may normally provide between 4.5 and 5.25 volts to any given device. However, it may be desirable to provide around 4.5 volts to the light source unit 108 and LEDs before the energy is converted to photons in order to provide the appropriate amount of lighting. Accordingly, the regulator 426 may change the voltage output to meet the specific voltage requirements to provide the desired lighting for the LEDs.

What is claimed is:

1. A system for providing lighting to a server computing device, the system comprising:
    a server computing device;
    a light source unit disposed at a first posterior side location of the server computing device, the light source unit configured to at least provide lighting to a posterior side of the server computing device via one or more light emitting diodes;
    the light emitting diodes coupled to at least a second posterior side location of the server computing device; and
    wherein the light source unit includes a first universal serial bus (USB) interface configured to receive a first end of a USB cable, the USB cable configured to connect to a power source at a second end, the power source for use in providing power to the light emitting diodes.

2. The system of claim 1, wherein the second posterior side location includes a first portion of a first inner sidewall of a frame of the server computing device, an inner top portion of the frame, and a second portion of a second inner sidewall of the frame.

3. The system of claim 1, wherein the first posterior side location and the second posterior side location are a same location.

4. The system of claim 1, wherein the light emitting diodes form a continuous layout from a first inner sidewall of a frame of the server computing device, to an inner top portion of the frame, to a second inner sidewall of the frame.

5. The system of claim 1, further comprising:
    a door axially coupled to a posterior side of a frame of the server computing device; and
    a motion sensor configured to cause the light emitting diodes to turn on when the door is opened.

6. The system of claim 1, wherein the power source is a first module of the server computing device.

7. The system of claim 6, wherein the first module is a maintenance module.

8. The system of claim 1, wherein the power source is a user device having a battery and a second USB interface.

9. A light source unit for providing lighting to a posterior side of a server computing device, the light source unit comprising:
    a light emitting diode interface configured to cause one or more light emitting diodes to provide lighting to the posterior side of the server computing device;
    a universal serial bus (USB) interface configured to receive a first end of a USB cable, the USB cable configured to connect to a power source at a second end, the power source for use in providing power to the light emitting diodes; and
    a motion sensor configured to cause the light emitting diodes to turn on when a door is opened, wherein the door is axially coupled to a posterior side of a frame of the server computing device.

10. The light source unit of claim 9, wherein the light emitting diodes are for use in forming a continuous layout from a first inner sidewall of a frame of the server computing device, to an inner top portion of the frame, to a second inner sidewall of the frame.

11. The light source unit of claim 9, wherein the power source is a first module of the server computing device.

12. The light source unit of claim 9, wherein the power source is a user computing device.

13. The light source unit of claim 9, further comprising a switch configured to allow user input for use in turning the light emitting diodes on or off.

14. A kit for providing lighting to a server computing device, the kit comprising:
    a light source unit configured to at least provide lighting to a posterior side of the server computing device via one or more light emitting diodes;
    a universal serial bus (USB) cable for coupling to the light source unit at a first end and for further coupling to a power source at a second end, the power source for use in providing power to the light emitting diodes; and
    a strip for use in forming a continuous layout from a first inner sidewall of a frame of the server computing device, to an inner top portion of the frame, to a second inner sidewall of the frame.

15. The kit of claim 14, further comprising a motion sensor configured to turn the light emitting diodes on or off.

16. The kit of claim 14, wherein the power source is a first module of the server computing device.

17. The kit of claim 14, wherein the power source is a user computing device, the user computing device being one of: a mobile phone device, a smart watch, a laptop, or a tablet computing device.

18. The kit of claim 14, further comprising one or more fasteners for use in attaching the light emitting diodes to the server computing device.

\* \* \* \* \*